US012657387B2

(12) United States Patent
Herard et al.

(10) Patent No.: US 12,657,387 B2
(45) Date of Patent: Jun. 16, 2026

(54) CLASSIFICATION OF COMPLIANCE TEXT DATA WITH FEW SHOT NATURAL LANGUAGE MODEL

(71) Applicant: FMR LLC, Boston, MA (US)

(72) Inventors: Vall Herard, Boston, MA (US); John Mariano, Boston, MA (US); John McCrae, Boston, MA (US); Jason Megaro, Boston, MA (US)

(73) Assignee: FMR LLC, Boston, MA (US)

( * ) Notice: Subject to any disclaimer, the term of this patent is extended or adjusted under 35 U.S.C. 154(b) by 275 days.

(21) Appl. No.: 17/891,258

(22) Filed: Aug. 19, 2022

(65) Prior Publication Data

US 2023/0074189 A1    Mar. 9, 2023

Related U.S. Application Data

(60) Provisional application No. 63/234,838, filed on Aug. 19, 2021.

(51) Int. Cl.
| | |
|---|---|
| *G06F 40/35* | (2020.01) |
| *G06F 40/289* | (2020.01) |
| *G06N 3/045* | (2023.01) |
| *G06N 3/0895* | (2023.01) |
| *G06Q 40/06* | (2012.01) |

(52) U.S. Cl.
CPC ........... *G06F 40/289* (2020.01); *G06N 3/045* (2023.01)

(58) Field of Classification Search
CPC ........ G06F 40/279; G06F 40/30; G06F 40/35; G06N 3/04; G06N 3/045; G06N 3/048; G06N 3/088; G06N 3/0895; G06Q 40/06

USPC ................. 704/1, 9; 706/12, 20, 27; 705/45
See application file for complete search history.

(56) References Cited

U.S. PATENT DOCUMENTS

| | | | | |
|---|---|---|---|---|
| 10,296,557 | B2 * | 5/2019 | Dettinger ................ | G06F 40/10 |
| 2006/0282771 | A1 * | 12/2006 | Vinci .................... | G06F 40/226 |
| | | | | 715/209 |
| 2009/0241165 | A1 * | 9/2009 | Tyree ..................... | G06F 21/10 |
| | | | | 726/1 |
| 2012/0116984 | A1 * | 5/2012 | Hoang ................... | G06Q 10/10 |
| | | | | 705/317 |

(Continued)

FOREIGN PATENT DOCUMENTS

| | | | | |
|---|---|---|---|---|
| EP | 4134921 A1 * | 2/2023 | ............. | G06F 16/75 |

OTHER PUBLICATIONS

C. Cortes and V. Vapnik, "Support-Vector Networks," Machine Learning, 20, 273-297 (1995).

(Continued)

*Primary Examiner* — Martin Lerner
(74) *Attorney, Agent, or Firm* — Cesari and McKenna, LLP

(57) ABSTRACT

Methods and apparatuses are described for intelligent text classification with limited or no training data. A server computing device receives one or more of structured text or unstructured text corresponding to compliance text data from a database. The server computing device executes a trained few-shot natural language inference (NLI) classification model on one or more sentences in the received compliance text data to identify whether the one or more sentences comprise a compliance violation. The server computing device transmits the results of the model execution to a remote computing device.

22 Claims, 4 Drawing Sheets

Receive one or more sentences of compliance text data 302

Execute a trained few-shot natural language inference (NLI) classification model on sentences from the received compliance text data to identify whether the received text includes a compliance violation 304

Transmit output from the model execution to a remote computing device 306

300

(56) References Cited

U.S. PATENT DOCUMENTS

| | | | | |
|---|---|---|---|---|
| 2012/0150531 | A1* | 6/2012 | Bangalore | G06F 40/40 |
| | | | | 704/9 |
| 2015/0106091 | A1* | 4/2015 | Wetjen | G10L 15/26 |
| | | | | 704/235 |
| 2016/0328384 | A1* | 11/2016 | Divakaran | G06F 40/30 |
| 2018/0114055 | A1* | 4/2018 | Wang | G06V 40/168 |
| 2019/0180097 | A1* | 6/2019 | Ferguson | G06N 3/02 |
| 2019/0318363 | A1* | 10/2019 | Marascu | G06F 40/30 |
| 2019/0318364 | A1* | 10/2019 | Marascu | G06F 40/295 |
| 2020/0219111 | A1* | 7/2020 | Nair | G06F 40/284 |
| 2020/0265196 | A1* | 8/2020 | Ravi | G06F 40/30 |
| 2020/0387911 | A1* | 12/2020 | Yoon | G06F 21/6227 |
| 2021/0034945 | A1* | 2/2021 | Mane | G06N 3/045 |
| 2021/0081566 | A1* | 3/2021 | Broudou | G06N 5/022 |
| 2021/0081613 | A1* | 3/2021 | Begun | G06F 40/117 |
| 2022/0309332 | A1* | 9/2022 | V V Ganeshan | G06F 40/30 |
| 2022/0359048 | A1* | 11/2022 | Patil | G06F 40/216 |
| 2024/0028826 | A1* | 1/2024 | Choi | G06F 40/284 |

OTHER PUBLICATIONS

O. Sulea et al., "Exploring the Use of Text Classification in the Legal Domain," Proceedings of the Second Workshop on Automated Semantic Analysis of Information in Legal Texts co-located with the 16th International Conference on Artificial Intelligence and Law (ICAIL 2017), London, United Kingdom, Jun. 16, 2017, available at https://arxiv.org/pdf/1710.09306.pdf, 5 pages.

F. Wei et al., "Empirical Study of Deep Learning for Text Classification in Legal Document Review," IEEE International Conference on Big Data (Big Data 2018), Seattle, Washington, USA, Dec. 10-13, 2018, pp. 3317-3320, available at https://arxiv.org/pdf/1904.01723.pdf.

J. Devlin et al., "BERT: Pre-training of Deep Bidirectional Transformers for Language Understanding," Proceedings of the 2019 Conference of the North American Chapter for the Association for Computational Linguistics: Human Language Technologies (NAACL-HLT) 2019, Minneapolis, Minnesota, vol. 1 (Long and Short Papers), pp. 4171-4186.

Z. Shaheen et al., "Large Scale Legal Text Classification Using Transformer Models," arXiv:2010.12871v1 [cs.CL] Oct. 24, 2020, 11 pages, available at https://arxiv.org/pdf/2010.12871.pdf.

C. Mahoney et al., "A Framework for Explainable Text Classification in Legal Document Review," 2019 IEEE International Conference on Big Data (Big Data), Los Angeles, California, USA, Dec. 9-12, 2019, pp. 1858-1867, available at https://arxiv.org/pdf/1912.09501.pdf.

R. Nallapati and C. Manning, "Legal Docket-Entry Classification: Where Machine Learning Stumbles," Proceedings of the 2008 Conference on Empirical Methods in Natural Language Processing, Honolulu, Hawaii, USA, Oct. 2008, pp. 438-446.

N. Reimers and I. Gurevych, "Sentence-BERT: Sentence Embeddings using Siamese BERT-Networks," Proceedings of the 2019 Conference on Empirical Methods in Natural Language Processing and the 9th International Joint Conference on Natural Language Processing (EMNLP-IJCNLP 2019), Hong Kong, China, Nov. 3-7, 2019, pp. 3982-3992.

E. Hoffer and N. Ailon, "Deep metric learning using Triplet network," Similarity-Based Pattern Recognition—Third International Workshop (SIMBAD 2015), Copenhagen, Denmark, Oct. 12-14, 2015, pp. 84-92, available at https://arxiv.org/pdf/1412.6622.pdf.

K. Thurnhofer-Hemsi et al., "Radial basis function kernel optimization for Support Vector Machine classifiers," arXiv:2007.08233v1 [cs.LG] Jul. 16, 2020, 17 pages, available at https://arxiv.org/pdf/2007.08233.pdf.

W. Yin et al., "Benchmarking Zero-shot Text Classification: Datasets, Evaluation and Entailment Approach," Proceedings of the 2019 Conference on Empirical Methods in Natural Language Processing and the 9th International Joint Conference on Natural Language Processing (EMNLP-IJCNLP 2019), Hong Kong, China, Nov. 3-7, 2019, pp. 3912-3921, available at https://arxiv.org/pdf/1909.00161.pdf.

M. Lewis et al., "BART: Denoising Sequence-to-Sequence Pretraining for Natural Language Generation, Translation, and Comprehension," Proceedings of the 58th Annual Meeting of the Association for Computational Linguistics (ACL 2020), Online, Jul. 5-10, 2020, pp. 7871-7880.

D. Kingma and J. Ba, "Adam: A Method for Stochastic Optimization," 3rd International Conference on Learning Representations (ICLR 2015), San Diego, California, USA, May 7-9, 2015, Conference Track Proceedings, 15 pages, available at https://www.arxiv.org/pdf/1412.6980v6.pdf.

* cited by examiner

100

Receive one or more sentences of compliance text data 302

Execute a trained few-shot natural language inference (NLI) classification model on sentences from the received compliance text data to identify whether the received text includes a compliance violation 304

Transmit output from the model execution to a remote computing device 306

300

400

CLASSIFICATION OF COMPLIANCE TEXT DATA WITH FEW SHOT NATURAL LANGUAGE MODEL

RELATED APPLICATIONS

This application claims priority to U.S. Provisional Patent Application No. 63/234,838, filed on Aug. 19, 2021, which is incorporated by reference herein in its entirety.

TECHNICAL FIELD

This application relates generally to methods and apparatuses, including computer program products, for intelligent text classification with limited or no training data.

BACKGROUND

Many industries, including financial services, must follow strict regulatory rules in their communications with the public. For example, regulatory content standards require that communications are fair and balanced and are not promissory, exaggerated, unwarranted, or misleading to investors. There is significant expense to comply with regulatory rules due to the cost of hiring highly qualified staff to review and remediate materials, and file and address comments with respective regulatory agencies. With recent advances in Natural Language Processing (NLP) technologies, it is increasingly becoming possible to automatically flag high-risk language and thus reduce the cost of compliance reviews.

Current technology has applied text classification techniques to legal texts. For example, there are methods based on counting the words in the text and then classifying using methods such as support vector machines (as described in Cortes and Vapnik, 1995, Support-vector networks, *Machine learning*, 20 (3): 273-297 (incorporated herein by reference)) for example by Sulea et al., 2017, Exploring the use of text classification in the legal domain. In *Proceedings of the Second Workshop on Automated Semantic Analysis of Information in Legal Texts co-located with the 16th International Conference on Artificial Intelligence and Law (ICAIL* 2017), London, UK, Jun. 16, 2017, volume 2143 of CEURWorkshop Proceedings, CEUR-WS.org. (incorporated herein by reference), where they applied this method to the classification of texts according to the legal area, ruling and time span of the text. Deep learning methods such as Convolutional Neural Networks (CNNs) have been shown to further improve the performance of such systems (as described in Wei et al., 2018, Empirical study of deep learning for text classification in legal document review, In *IEEE International Conference on Big Data, Big Data* 2018, Seattle, WA, USA, Dec. 10-13, 2018, pages 3317-3320, IEEE (incorporated herein by reference)). More recently, the emergence of large pretrained language models such as BERT (as described in Devlin et al., 2019, BERT: Pretraining of deep bidirectional transformers for language understanding. In *Proceedings of the 2019 Conference of the North American Chapter of the Association for Computational Linguistics: Human Language Technologies, Volume I (Long and Short Papers)*, pages 4171-4186, Minneapolis, Minnesota. Association for Computational Linguistics (incorporated herein by reference)) has further increased the performance and Shaheen et al., 2020, Large scale legal text classification using transformer models. CoRR, available at arxiv.org/abs/2010.12871 (incorporated herein by reference) showed that these models could be used to classify legal texts according to thousands of labels and even on multiple languages if sufficient training data exists.

A criticism of such NLP-based approaches to predictive coding, especially with the emergence of more sophisticated deep learning methods, is that they can appear to be 'black boxes,' and thus there has been work in providing explicable systems (as in Mahoney et al., 2019, A framework for explainable text classification in legal document review. In 2019 *IEEE International Conference on Big Data (Big Data)*, Los Angeles, CA, USA, Dec. 9-12, 2019, pages 1858-1867, IEEE (incorporated herein by reference)) that can identify snippets and provides explanations for why they make certain predictions. Similarly, some work has gone into the investigation of specific complexities of legal texts, such as in Nallapati and Manning, 2008, Legal docket classification: Where machine learning stumbles. In *Proceedings of the* 2008 *Conference on Empirical Methods in Natural Language Processing*, pages 438-446, Honolulu, Hawaii, Association for Computational Linguistics (incorporated herein by reference), who showed that for some legal texts the complex combination of negative and positive statements can confuse machine learning approaches. Nallapati and Manning showed that by combining these machine learning approaches with propositional logic, text classification systems could handle intricate legal wording.

However, artificial intelligence (AI) models such as NLP models generally require a large amount of relevant, high-quality data. The more labeled data, the more accurate the machine learning model predictions can be. A lack of professional expertise in labeling data can lead to unreliable AI software. As can be appreciated, creating that data is manual and expensive, especially in regulatory technology regarding the cost of legal and compliance experts for manual review and quality assurance.

In addition, existing technology for compliance detection of content standards violations is primarily lexicon-based. For example, these systems generally flag any content that includes certain keywords such as "guarantee." This approach is inefficient and can lead to missed violations that don't include specific keywords and incorrectly flagging content that is not problematic (in this example, incorrectly flagging content like 'guarantee period' in disclosure or an annuity guarantee).

Finally, most existing methods of text classification only consider the local features of the samples, and their experimental results show better performance than traditional non-deep learning methods. However, in these methods, the global features of the sample are usually ignored, and these ignored global features will affect the classification accuracy.

SUMMARY

Therefore, what is needed are computerized methods and systems to overcome the above-described challenges and provide for the utilization of Natural Language Inference (NLI) to allow AI models to classify sentences in certain violation categories for regulatory content standards with limited labeled data by experts. The NLI techniques described herein are capable of understanding the compositional semantic and language context of documents (text, transcripts of audio/video input, etc.) in order to predict the classes of violations. This NLI approach takes the text to be predicted as the premise and the classifications, i.e. promissory/other, as hypothesis. When the NLI model predicts that the premise "entails" the hypothesis, the model takes the label to be true—turning NLI into classification for compliant classes of content standards.

The technology described herein advantageously uses a triple capsule network architecture for classifying compliance-related text. This architecture classifies if a given sentence is in a particular class of compliance violation to a regulatory content standard. Triplet loss enables the network to distinguish between positive and negative examples of a class. This distinction allows end users to understand the specific reason/risk as it relates to the regulatory content standards to enable them to understand the problem and to remediate accordingly.

The network learns sentence representations where examples of the same class are close together. The closeness of two sentences can be measured by calculating the euclidean distance between their representation. For the final classification, the methods and systems use Support Vector Machine (SVM) with Radial Basis Function (RBF) kernel. SVM is used for classification as it learns by minimizing the hinge loss which is like the loss used for training the triplet network.

The invention, in one aspect, features a computerized method of intelligent text classification with limited or no training data. A server computing device receives one or more of structured text or unstructured text corresponding to compliance text data from a database. The server computing device executes a trained few-shot natural language inference (NLI) classification model on one or more sentences in the received compliance text data to identify whether the one or more sentences comprise a compliance violation. The server computing device transmits output from the model execution to a remote computing device.

The invention, in another aspect, features a system for intelligent text classification with limited or no training data. The system comprises a server computing device that receives one or more of structured text or unstructured text corresponding to compliance text data from a database. The server computing device executes a trained few-shot natural language inference (NLI) classification model on one or more sentences in the received compliance text data to identify whether the one or more sentences comprise a compliance violation. The server computing device transmits output from the model execution to a remote computing device.

Any of the above aspects can include one or more of the following features. In some embodiments, the trained few-shot NLI classification model comprises a plurality of instances of a same neural network with shared parameters. In some embodiments, each neural network instance of the trained few-shot NLI classification model receives a different text sample from the received text. In some embodiments, a first neural network instance receives a positive text sample, a second neural network instance receives an anchor text sample, and a third neural network instance receives a negative text sample. In some embodiments, the anchor text sample and the positive text sample correspond to a first class and the negative text sample corresponds to a second class.

In some embodiments, each neural network instance comprises an encoder layer, a perceptron layer comprising a first fully connected layer and a rectified linear activation function (ReLU) layer, and a second fully connected layer. In some embodiments, the trained few-shot NLI classification model generates a first output comprising (i) a first distance between the positive text sample processed by the first neural network instance and the anchor text sample processed by the second neural network instance and (ii) a second distance between the anchor text sample processed by the second neural network instance and the negative text sample processed by the third neural network instance. In some embodiments, the first distance comprises a Euclidian distance and the second distance comprises a Euclidian distance.

In some embodiments, the server computing device applies a triplet loss function to the first distance and the second distance to retrain the few-shot natural language inference (NLI) classification model. In some embodiments, the server computing device classifies output from the trained few-shot NLI classification model using a support vector machine (SVM) with radial basis function (RBF) kernel. In some embodiments, when the SVM with RBF kernel classifies the output from the trained few-shot NLI classification model as comprising a compliance violation, the remote computing device transmits an alert message to a client computing device for remediation of the compliance violation.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
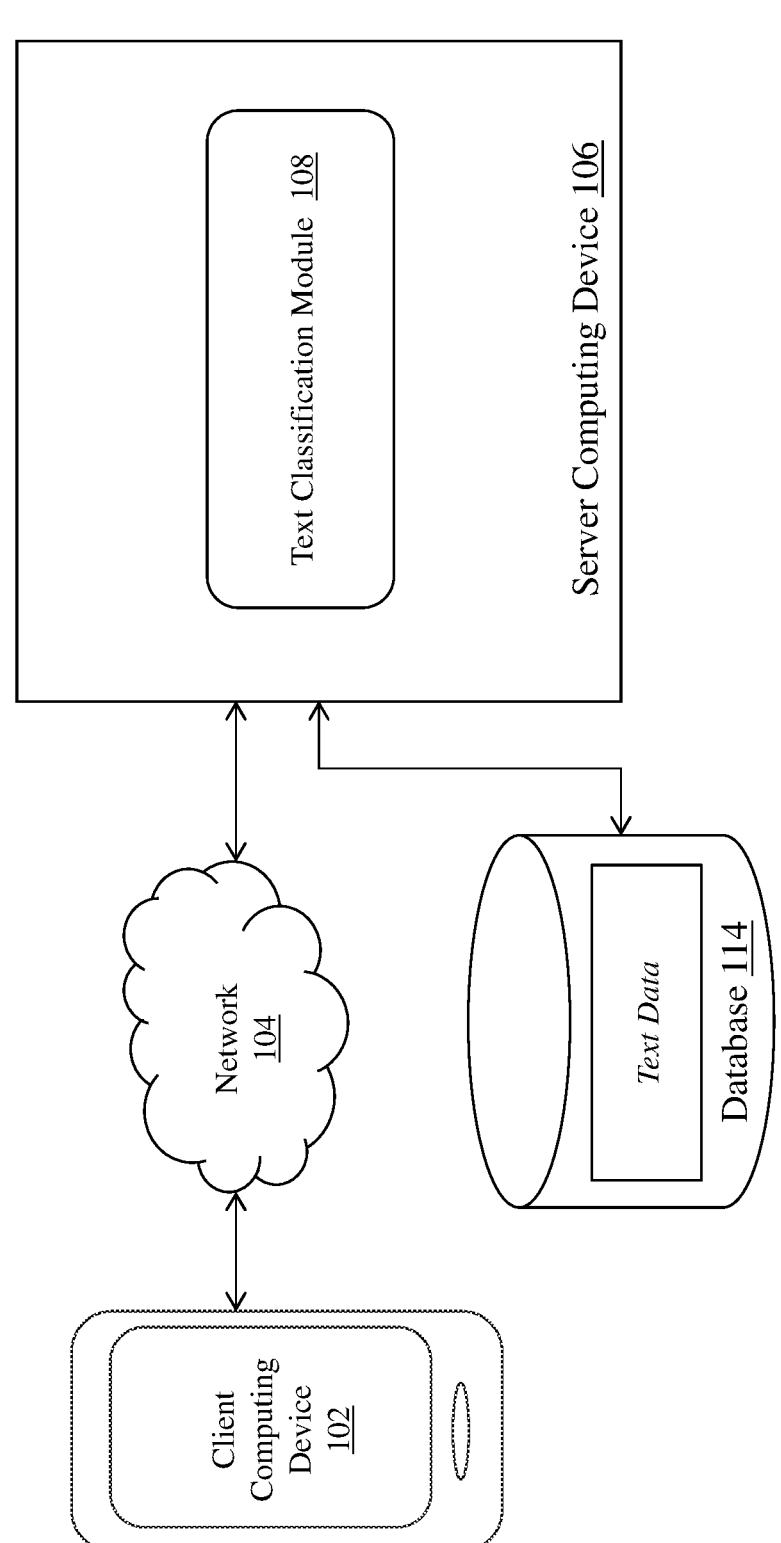
FIG. 1 is a block diagram of a system for intelligent text classification with limited or no training data.
Figure 1:

FIG. 1 is a block diagram of a system 100 for intelligent text classification with limited or no training data. The system 100 includes a client computing device 102, a communications network 104, a server computing device 106 that includes a text classification module 108, and a database 114 that includes text data.

The client computing device 102 connects to the communications network 104 in order to communicate with the server computing device 106 to provide input and receive output relating to the process of intelligent text classification with limited or no training data as described herein. Exemplary client computing devices 102 include but are not limited to computing devices such as smartphones, tablets, laptops, desktops, or other similar devices. It should be appreciated that other types of devices that are capable of connecting to the components of the system 100 can be used without departing from the scope of invention.

The communications network 104 enables the client computing device 102 to communicate with the server computing device 106. The network 104 is typically a wide area network, such as the Internet and/or a cellular network. In some embodiments, the network 104 is comprised of several discrete networks and/or sub-networks (e.g., cellular to Internet, PSTN to Internet, PSTN to cellular, etc.).

The server computing device 106 is a device including specialized hardware and/or software modules that execute on a processor and interact with memory modules of the server computing device 106, to receive data from other components of the system 100, transmit data to other components of the system 100, and perform functions for intelligent text classification with limited or no training data as described herein. The server computing device 106 includes a text classification module 108 that executes on one or more processors of the server computing device 106. In some embodiments, the module 108 is a specialized set of computer software instructions programmed onto one or more dedicated processors in the server computing device 106 and can include specifically-designated memory locations and/or registers for executing the specialized computer software instructions.

It should be appreciated that any number of computing devices, arranged in a variety of architectures, resources, and configurations (e.g., cluster computing, virtual computing, cloud computing) can be used without departing from the scope of the invention. The exemplary functionality of the text classification module 108 is described in detail throughout this specification.

In some embodiments, the text classification module 108 can comprise a software program that receives text data (e.g., compliance related text data/documents in the form of structured or unstructured text) from database 114 and processes the text data as described herein to classify the text (e.g. according to compliance violation parameters) and provide the classified text to a remote user.

The database 114 is a computing device (or in some embodiments, a set of computing devices) coupled to the server computing device 106 and is configured to receive, generate, and store specific segments of data relating to the process of intelligent text classification with limited or no training data as described herein. In some embodiments, all or a portion of the database 114 can be integrated with the server computing device 106 or be located on a separate computing device or devices. The database 114 can comprise one or more databases configured to store portions of data used by the other components of the system 100, as will be described in greater detail below.

Figure 2:
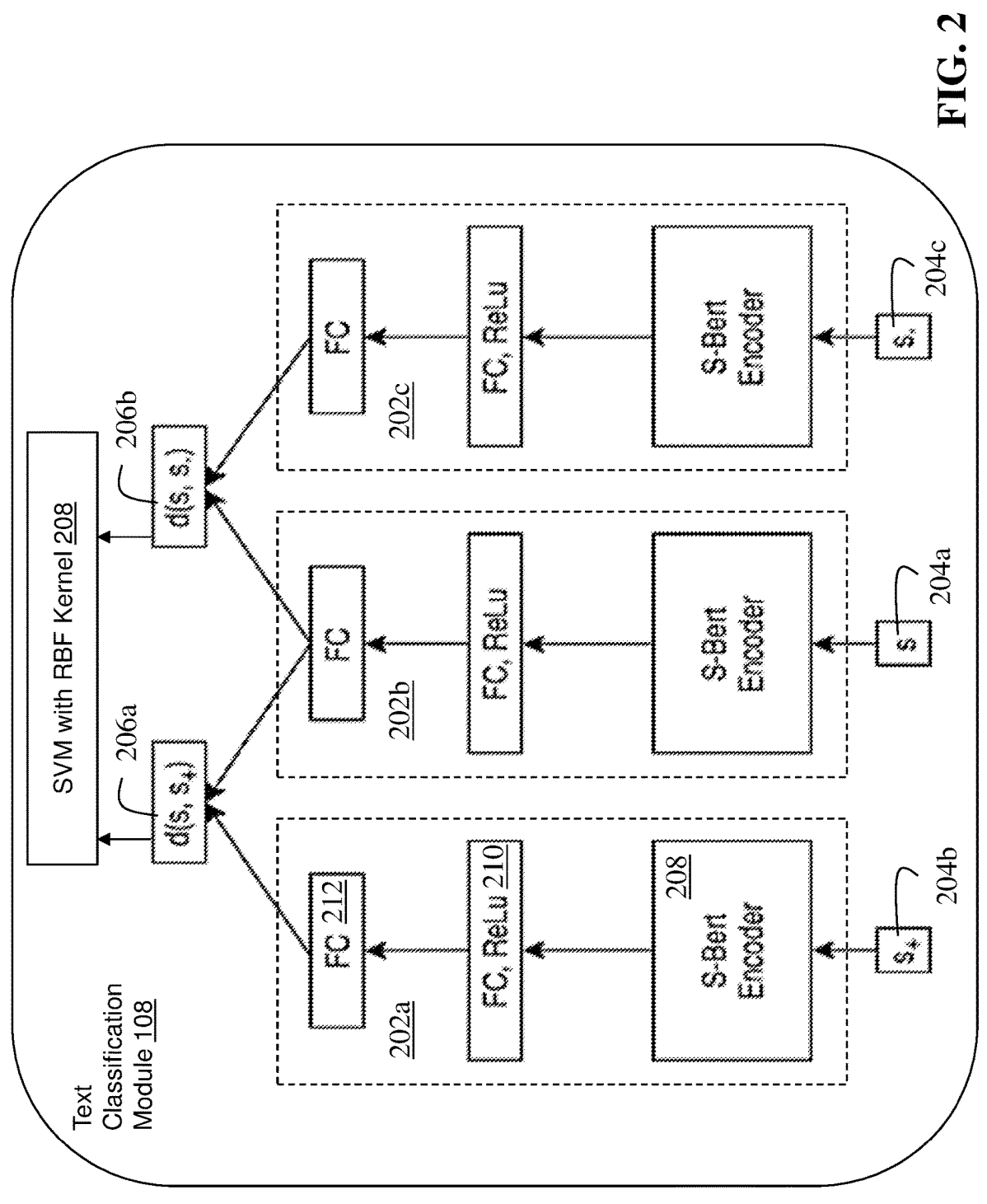
FIG. 2 is a block diagram of a triple capsule network architecture for intelligent text classification.

FIG. 2 is a block diagram of a triple capsule network architecture 200 for intelligent text classification, used by the text classification module 108 of server computing device 106 of FIG. 1. As shown in FIG. 2, the triple capsule network 200 comprises three instances (202a, 202b, 220c) of the same neural network with shared parameters. The network takes as input three examples in each sample. The three samples consist of the anchor 204a(s), positive 204b (s+) and negative 204c (s−) example. The anchor 204a and positive 204b example belong to the same class, while the negative 204c example belongs to a different class. The network 200 outputs two values, the distance 206a between the anchor and the positive example and the distance 206b between the anchor and the negative example.

Figure 3:
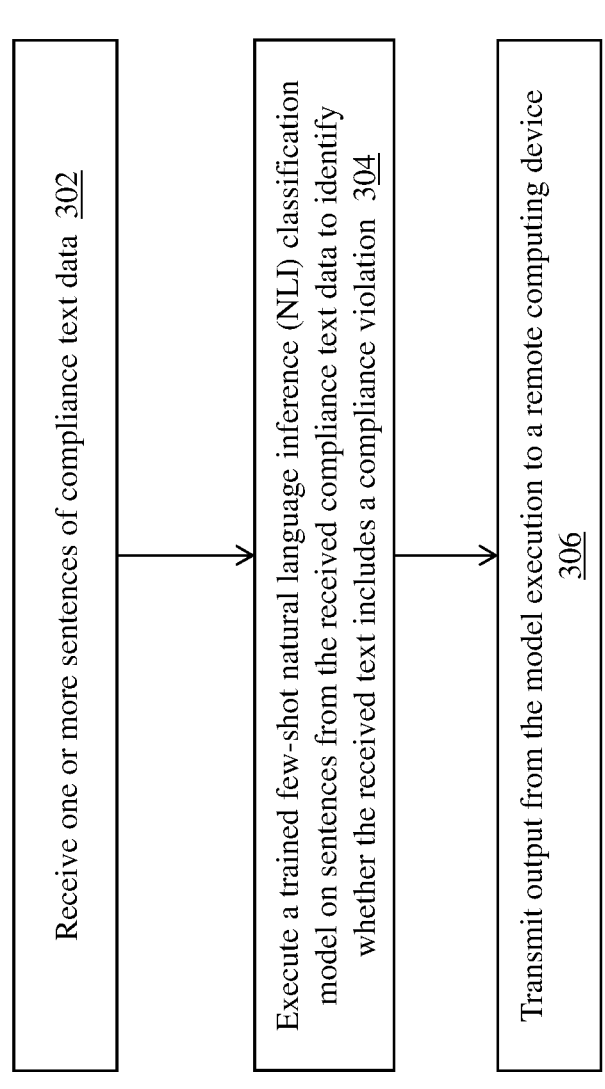
FIG. 3 is a flow diagram of a computerized method of intelligent text classification with limited or no training data.

FIG. 3 is a flow diagram of a computerized method 300 of intelligent text classification with limited or no training data, using system 100 of FIG. 1. The text classification module 108 receives (step 302) a corpus of structured and/or unstructured text from the database 114 for classification. The text classification module 108 executes (step 304) a trained few-shot NLI classification model on sentences from the received compliance text data to identify whether the received text includes a compliance violation. During execution of the model, the network 200 in text classification module 108 encodes each incoming sentence using a Sentence-Bert (S-Bert) Encoder (e.g., 208) (as described in Reimers and Gurevych, 2019, Sentence-bert: Sentence embeddings using siamese bert-networks. In *Proceedings of the* 2019 *Conference on Empirical Methods in Natural Language Processing and the* 9*th International Joint Conference on Natural Language Processing, EMNLP-IJCNLP* 2019, *Hong Kong, China, Nov.* 3-7, 2019, pages 3980-3990, Association for Computational Linguistics (incorporated herein by reference)). The Sentence-Bert Encoder captures the contextual information in a sentence in a fixed size vector representation. The contextual sentence embedding is then fed to a two-layer perceptron: fully connected layer (FC) and rectified linear activation function layer (ReLU) (layer 210) and another FC layer (layer 212). The hidden layer 210 has ReLU activation for introducing non-linearity in the perceptron.

Exemplary algorithms used by the layers of the neural network are below:

$$e_s^1 = \text{S-BERT}(s) \tag{1}$$

$$e_s^2 = ReLu\left(W_{\theta,1} e_s^1\right) \tag{2}$$

$$e_s^3 = W_{\theta,2} e_s^2 \tag{3}$$

where $W_{\theta,1} \in R^{d_c 2 \times d_c 1_h}$ and $W_{\theta,2} \in R^{d_c 3 \times d_c 2}$ and the parameter matrices to be learned during training.

Triplet loss (as described in Hoffer and Ailon, 2015, Deep metric learning using triplet network. In Similarity-Based Pattern Recognition—Third International Workshop, SIMBAD 2015, Copenhagen, Denmark, Oct. 12-14, 2015, Proceedings, volume 9370 of Lecture Notes in Computer Science, pages 84-92, Springer (incorporated herein by reference)) has been used in few-shot classification methods. Although introduced for images, it has been successfully adapted in natural language processing. Triplet loss (L) enables the network to distinguish between positive and negative examples of a class. It is defined in the equation below:

$$\mathcal{L} = \sum \max(d(a, p) - d(a, n) + \alpha, 0)$$

where a is the anchor sentence, p is a sentence drawn from the same class as a and n is a sentence drawn from a class different from that of a. The function d computes the distance between two sentences and $\alpha$ is the margin enforced between the positive and negative examples.

The function d is defined below:

$$d(s, s_+) = \left\| e_s^3 - e_{s+}^3 \right\|_2$$

$$d(s, s_-) = \left\| e_s^3 - e_{s-}^3 \right\|_2$$

where $\|\cdot\|_2$ denotes the $l_2$ norm. The triplet loss is leveraged to train the network model. The network learns sentence representations where examples of the same class are close together. The closeness of two sentences can be measured by calculating the euclidean distance between their representation. For the final classification, the system uses a Support Vector Machine (SVM) with Radial Basis Function (RBF) kernel. An exemplary SVM with RBF kernel is described in K. Thurnhofer-Hemsi et al., "Radial basis function kernel optimization for Support Vector Machine classifiers," arXiv: 2007.08233 [cs.LG], 17 Jul. 2020, which is incorporated herein by reference. The system uses an SVM for classification as it learns by minimizing the hinge loss which is similar to the loss used for training the triplet network.

Figure 4:
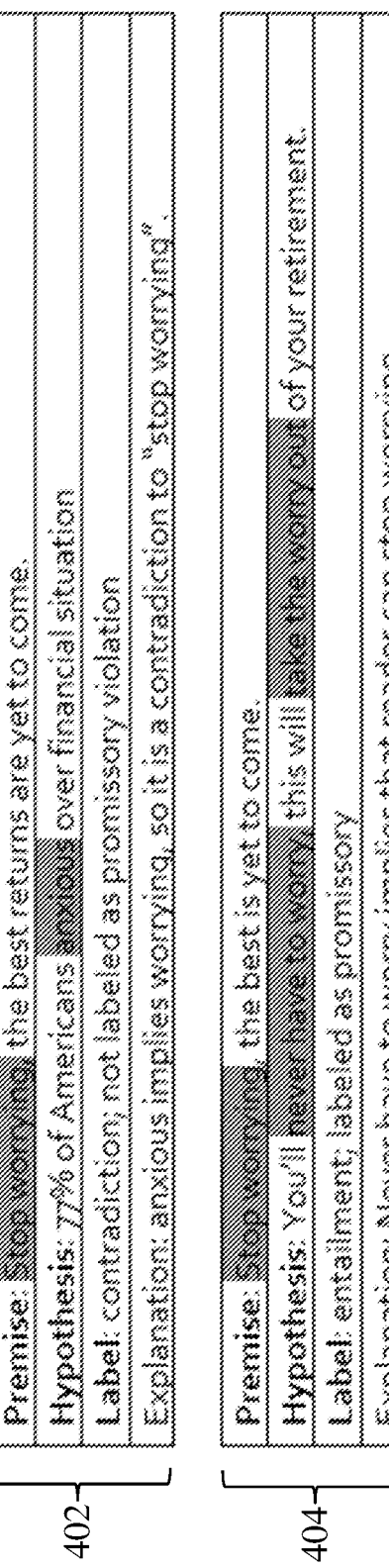
FIG. 4 is a diagram of an exemplary text classification generated by the system.

As can be appreciated, the systems and methods described herein can be applied to structured or unstructured text in any of a variety of different subject matter areas or domains. Exemplary domains include but are not limited to financial services, compliance, governmental regulation, pharmaceutical, and legal. In one example use case, the systems and methods described herein can be applied for regulatory compliance in the financial domain under, e.g., the U.S. regulation FINRA 22101 (which states that "no member may make any false, exaggerated, unwarranted, promissory or misleading statement or claim in any communication."). An exemplary text classification generated by the system 100 under this regulation is provided in FIG. 4. As shown in FIG. 4, the first example 402 displays a contradiction in that the hypothesis statement ("77% of Americans anxious over financial situation") contradicts the premise ("Stop worrying, the best returns are yet to come.") and would not be labeled as a promissory compliance violation. The second example 404 displays entailment in that the hypothesis statement ("You'll never have to worry, this will take the worry out of your retirement.") confirms the premise ("Stop worrying, the best is yet to come.") and thus the hypothesis statement is labeled as a promissory violation.

In some embodiments, when the text classification module 108 classifies the received text as either containing a compliance violation or not containing a compliance violation, server computing device 106 transmits (step 306) output from the module 108 to a remote computing device (e.g., client computing device 102). For example, server computing device 106 can transmit one or more data packets to client computing device 102 that include data (e.g., a flag, a text string, etc.) that indicates whether the received text comprises a compliance violation or not. Upon receiving the output, client computing device 102 can take one or more actions based upon the content of the output. In one example, client computing device 102 can transmit an alert message to one or more other computing devices that indicates the text includes a compliance violation and requests that the violation is remediated. In some embodiments, the alert message can include the specific text (e.g., one or more sentences) that were analyzed by text classification module 108 and determined to contain a violation along with a reference to a location of the text (e.g., document name, document number, version, etc.).

The systems and methods were trained and tested in several different settings: first, in a traditional data-heavy supervised setting, where a large number of existing examples have been classified; second, in a zero-shot training situation, where an expert was to provide only rough guidelines for what is not compliant with the legal code; and third, combining this in a few-shot setting where with comparatively little training data, the system achieves performance that is equivalent with the data-heavy supervised setting and thus enables text classification systems for regulatory compliance to be constructed quickly and with little effort allowing them to cover a wide range of industries and national regulatory frameworks.

In the experimental setup, the dataset was split into training, development, and test datasets. These datasets comprise varying numbers of promissory and non-promissory sentences. For the zero-shot learning model, the system samples 40 promissory and 190 non-promissory example sentences from the training set and trains the model on this subset.

The classification performance of the few-shot learning model described herein was compared against existing supervised learning methods:

Naive Bayes: We train a Naive Bayes classification model using tf-idf scores of the tokens in the sentence.

Multi Layer Perceptron (MLP): We train a two layer perceptron with ReLu activation in the hidden layer using the tf-idf scores of the sentence tokens as input features to the model.

SVM: Similar to the MLP model, we train a SVM model for the classification task. We set the regularization parameter C and gamma to 1.0 and 0.1 respectively.

Sentence-Bert: This setting is similar to our proposed approach. We encode each sentence into a fixed sized vector using its Sentence-Bert embedding. The sentence embedding is then fed into a 3 layer fully connected neural network with ReLu activation in the first two layers. The model is trained by minimizing the CrossEntropy Loss of classification using Adam optimizer.

Laser: In this setting, we encode each sentence using its Laser embeddings. The remaining architecture remains the same as that using in the Sentence-Bert model.

In addition to the supervised approaches, we compare the few-shot learning approach against a zero-shot learning approach. Yin et al., 2019, Benchmarking zero-shot text classification: Datasets, evaluation and entailment approach, In *Proceedings of the* 2019 *Conference on Empirical Methods in Natural Language Processing and the 9th International Joint Conference on Natural Language Processing, EMNLP-IJCNLP* 2019*, Hong Kong, China, Nov.* 3-7, 2019, pages 3912-3921, Association for Computational Linguistics (incorporated herein by reference) suggested a method for using pre-trained natural language inference models as sequence classifiers. To this end, the text classification module 108 uses the BART model (described in Lewis et al., 2020, BART: denoising sequence-to-sequence pretraining for natural language generation, translation, and comprehension, In *Proceedings of the* 58*th Annual Meeting of the Association for Computational Linguistics, A C L* 2020*, Online, Jul.* 5-10, 2020, pages 7871-7880, Association for Computational Linguistics (incorporated herein by reference)) as the zero-shot learning model. The text classification module 108 considers the sentences tagged as 'promissory' as hypothesis. The probability of a sentence being a premise for these tagged sentences is calculated using the BART model. The module 108 then considers the maximum of those scores, and if the maximum score is greater than 0.7, the module 108 classifies the sentence as a promissory sentence.

For the task, the module 108 uses the Sentence-Bert base model. It encodes a sentence into a fixed size vector of length 768. The module 108 sets $d_{e^1}$, $d_{e^2}$ and $d_{e^3}$ to 768, 300 and 10 respectively. For every positive sentence, the module 108 supplies three negative sentences for the anchor sentence. The value of a is set to 1:0. The batch size is set to 16 for the triplet network and is trained with Adam optimizer (as described in Kingma and Ba, 2015, "Adam: A method for stochastic optimization," In 3*rd International Conference on Learning Representations, ICLR* 2015*, San Diego, CA, USA, May* 7-9, 2015*, Conference Track Proceedings* (incorporated herein by reference)) with a learning rate of 1e-5 for 10 epochs. The module 108 sets the cost parameter C and gamma of the SVM to 0.03 and 0.1 respectively.

As shown in Table 1 below, the few-shot method with very limited sentences provides solid results for precision, recall, and accuracy in comparison to the other supervised learning models:

TABLE 1

| Model | Precision | Recall | F1 | Accuracy |
|---|---|---|---|---|
| Naive Bayes | 0.78 | 0.48 | 0.60 | 0.75 |
| MLP | 0.66 | 0.70 | 0.68 | 0.75 |
| SVM | 0.76 | 0.67 | 0.71 | 0.79 |
| S-Bert | 0.72 | 0.69 | 0.70 | 0.78 |
| Laser | 0.75 | 0.68 | 0.71 | 0.79 |
| Zero-Shot | 0.48 | 0.75 | 0.59 | 0.60 |
| Few-shot(ours) | 0.64 | 0.66 | 0.65 | 0.73 |

Appendix A attached hereto provides further experimental test results that show the benefits of the few-shot text classification architecture described herein.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a program-mable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose micro-processors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, mag-neto-optical disks, or optical disks. A computer can also be operatively coupled to a communications network in order to receive instructions and/or data from the network and/or to transfer instructions and/or data to the network. Com-puter-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end com-ponent. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be inter-connected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area net-work (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communica-tions (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) net-work, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for intelligent text classification with limited or no training data, the system comprising a server computing device comprising a memory for storing computer-executable instructions and a processor that executes the computer-executable instructions to:

receive one or more of structured text or unstructured text corresponding to compliance text data from a database;

execute a trained few-shot natural language inference (NLI) classification model on sentences from the received compliance text data to identify whether the received text includes a compliance violation to a regulatory content standard in a financial domain, the compliance violation including a false statement, an exaggerated statement, an unwarranted statement, a promissory statement, or a misleading statement; and transmit output from the model execution to a remote computing device, the remote computing device generating a visual representation comprising an indicator that the received text includes a financial regulation compliance violation, a request to a user of the remote computing device to remediate the financial regulation compliance violation, a portion of the received text that contains the financial regulation compliance violation, and a reference to a location of the received text in a corresponding electronic document, the reference including each of: a document name of the electronic document, a document number of the electronic document, and a version of the electronic document, and the remote computing device displaying the visual representation to a user of the remote computing device.

2. The system of claim 1, wherein the trained few-shot NLI classification model comprises a plurality of instances of a same neural network with shared parameters.

3. The system of claim 2, wherein each neural network instance of the trained few-shot NLI classification model receives a different text sample from the received text.

4. The system of claim 3, wherein a first neural network instance receives a positive text sample, a second neural network instance receives an anchor text sample, and a third neural network instance receives a negative text sample.

5. The system of claim 4, wherein the anchor text sample and the positive text sample correspond to a first class and the negative text sample corresponds to a second class.

6. The system of claim 5, wherein each neural network instance comprises an encoder layer, a perceptron layer comprising a first fully connected layer and a rectified linear activation function (ReLU) layer, and a second fully connected layer.

7. The system of claim 6, wherein the trained few-shot NLI classification model generates a first output comprising (i) a first distance between the positive text sample processed by the first neural network instance and the anchor text sample processed by the second neural network instance and (ii) a second distance between the anchor text sample processed by the second neural network instance and the negative text sample processed by the third neural network instance.

8. The system of claim 7, wherein the first distance comprises a Euclidian distance and the second distance comprises a Euclidian distance.

9. The system of claim 8, wherein the server computing device applies a triplet loss function to the first distance and the second distance to retrain the few-shot natural language inference (NLI) classification model.

10. The system of claim 1, wherein the server computing device classifies output from the trained few-shot NLI classification model using a support vector machine (SVM) with radial basis function (RBF) kernel.

11. The system of claim 10, wherein when the SVM with RBF kernel classifies the output from the trained few-shot NLI classification model as comprising a financial regulation compliance violation, the remote computing device transmits an alert message to a client computing device for remediation of the financial regulation compliance violation.

12. A computerized method of intelligent text classification with limited or no training data, the method comprising:

receiving, by a server computing device, one or more of structured text or unstructured text corresponding to compliance text data from a database;

executing, by the server computing device, a trained few-shot natural language inference (NLI) classification model on one or more sentences in the received compliance text data to identify whether the one or more sentences comprise a compliance violation to a regulatory content standard in a financial domain, the compliance violation including a false statement, an exaggerated statement, an unwarranted statement, a promissory statement, or a misleading statement;

transmitting, by the server computing device, output from the model execution to a remote computing device;

generating, by the remote computing device, a visual representation comprising an indicator that the received text includes a financial regulation compliance violation, a request to a user of the remote computing device to remediate the financial regulation compliance violation, a portion of the received text that contains the financial regulation compliance violation, and a reference to a location of the received text in a corresponding electronic document, the reference including each of: a document name of the electronic document, a document number of the electronic document, and a version of the electronic document, and displaying, by the remote computing device, the visual representation to a user of the remote computing device.

13. The method of claim 12, wherein the trained few-shot NLI classification model comprises a plurality of instances of a same neural network with shared parameters.

14. The method of claim 13, wherein each neural network instance of the trained few-shot NLI classification model receives a different text sample from the received text.

15. The method of claim 14, wherein a first neural network instance receives a positive text sample, a second neural network instance receives an anchor text sample, and a third neural network instance receives a negative text sample.

16. The system of claim 15, wherein the anchor text sample and the positive text sample correspond to a first class and the negative text sample corresponds to a second class.

17. The method of claim 16, wherein each neural network instance comprises an encoder layer, a perceptron layer comprising a first fully connected layer and a rectified linear activation function (ReLU) layer, and a second fully connected layer.

18. The method of claim 17, wherein the trained few-shot NLI classification model generates a first output comprising (i) a first distance between the positive text sample processed by the first neural network instance and the anchor text sample processed by the second neural network instance and (ii) a second distance between the anchor text sample processed by the second neural network instance and the negative text sample processed by the third neural network instance.

19. The method of claim 18, wherein the first distance comprises a Euclidian distance and the second distance comprises a Euclidian distance.

20. The method of claim 19, wherein the server computing device applies a triplet loss function to the first distance and the second distance to retrain the few-shot natural language inference (NLI) classification model.

21. The method of claim 12, wherein the server computing device classifies output from the trained few-shot NLI classification model using a support vector machine (SVM) with radial basis function (RBF) kernel.

22. The method of claim 21, wherein when the SVM with RBF kernel classifies the output from the trained few-shot NLI classification model as comprising a financial regulation compliance violation, the remote computing device transmits an alert message to a client computing device for remediation of the financial regulation compliance violation.

* * * * *